US009865091B2

(12) United States Patent
Giraldi et al.

(10) Patent No.: US 9,865,091 B2
(45) Date of Patent: Jan. 9, 2018

(54) LOCALIZING DEVICES IN AUGMENTED REALITY ENVIRONMENT

(71) Applicant: MICROSOFT TECHNOLOGY LICENSING, LLC, Redmond, WA (US)

(72) Inventors: Riccardo Giraldi, Seattle, WA (US); Anatolie Gavriliuc, Kirkland, WA (US); Michelle Chua, Seattle, WA (US); Andrew Frederick Muehlhausen, Seattle, WA (US); Robert Thomas Held, Seattle, WA (US); Joseph van den Heuvel, Redmond, WA (US); Todd Alan Omotani, Redmond, WA (US); Richard J. Wifall, Sammamish, WA (US); Christian Sadak, Seattle, WA (US); Gregory Alt, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/843,596

(22) Filed: Sep. 2, 2015

(65) Prior Publication Data

US 2017/0061692 A1    Mar. 2, 2017

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0172* (2013.01); *G06F 3/011* (2013.01);
(Continued)

(58) Field of Classification Search
CPC ........ G06T 19/006; G06T 19/00; G06F 3/011
See application file for complete search history.

(56) References Cited

U.S. PATENT DOCUMENTS 7,296,747 B2    11/2007 Rohs
8,116,685 B2    2/2012 Bregman-Amitai et al.
(Continued)

FOREIGN PATENT DOCUMENTS

| WO | 2012015956 A2 | 2/2012 |
| WO | 2013154476 A1 | 10/2013 |
| WO | 2015064846 A1 | 5/2015 |

OTHER PUBLICATIONS

Prasad, et al., "Efficient Device Pairing using "Human-Comparable" Synchronized Audiovisual Patterns", In Proceedings of the 6th international conference on Applied cryptography and network security, Jun. 3, 2008, 19 pages.
(Continued)

*Primary Examiner* — Tapas Mazumder
(74) *Attorney, Agent, or Firm* — Alleman Hall Creasman & Tuttle LLP

(57) ABSTRACT

Examples are disclosed herein that relate to identifying and localizing devices in an environment via an augmented reality display device. One example provides, on a portable augmented reality computing device, a method including establishing a coordinate frame for an environment, and discovering, via a location-sensitive input device, a location of a physical manifestation of the device in the environment, assigning a device location for the device in the coordinate frame based upon the location of the physical manifestation, and modifying an output of the portable augmented reality computing device based upon a change in relative position between the portable augmented reality computing device and the physical manifestation in environment.

20 Claims, 5 Drawing Sheets

(51) Int. Cl.
*G06F 3/01* (2006.01)
*H04R 29/00* (2006.01)
*G06T 7/70* (2017.01)

(52) U.S. Cl.
CPC ............. *G06T 7/70* (2017.01); *H04R 29/005* (2013.01); *G06T 2215/16* (2013.01)

(56) References Cited

U.S. PATENT DOCUMENTS

| | | | |
|---|---|---|---|
| 8,405,729 B2 | 3/2013 | Jain | |
| 8,427,396 B1* | 4/2013 | Kim | G06F 3/1454 |
| | | | 345/8 |
| 8,446,364 B2 | 5/2013 | Solomon | |
| 8,736,427 B2 | 5/2014 | King | |
| 8,845,110 B1 | 9/2014 | Worley | |
| 8,879,994 B2 | 11/2014 | Brown et al. | |
| 8,970,733 B2 | 3/2015 | Faenger | |
| 2003/0193572 A1* | 10/2003 | Wilson | G08C 17/00 |
| | | | 348/207.99 |
| 2006/0135064 A1 | 6/2006 | Cho et al. | |
| 2007/0261008 A1* | 11/2007 | Seo | G06F 17/50 |
| | | | 716/119 |
| 2009/0049205 A1* | 2/2009 | Park | G09G 5/12 |
| | | | 710/4 |
| 2010/0066821 A1* | 3/2010 | Rosener | G06F 3/011 |
| | | | 348/77 |
| 2011/0065496 A1 | 3/2011 | Gagner et al. | |
| 2012/0198531 A1 | 8/2012 | Ort et al. | |
| 2014/0118631 A1 | 5/2014 | Cho | |
| 2014/0176395 A1 | 6/2014 | White | |
| 2014/0192085 A1* | 7/2014 | Kim | G06T 19/006 |
| | | | 345/633 |
| 2015/0133051 A1* | 5/2015 | Jamal-Syed | H04M 1/7253 |
| | | | 455/41.2 |
| 2015/0234456 A1* | 8/2015 | Cho | G06F 3/013 |
| | | | 345/156 |

OTHER PUBLICATIONS

Saxena, et al., "Universal Device Pairing Using an Auxiliary Device", Universal Device Pairing Using an Auxiliary Device, Jul. 23, 2008, 12 pages.

Bell, B. et al., "View Management for Virtual and Augmented Reality", In Proceedings of the ACM Symposium on User Interface Software and Technology (UIST 2001), Nov. 11, 2001, Orlando, Florida, 10 pages.

ISA European Patent Office, International Search Report and Written Opinion Issued in PCT Application No. PCT/US2016/044951, Oct. 27, 2016, WIPO, 16 pages.

IPEA European Patent Office, Second Written Opinion Issued in PCT Application No. PCT/US2016/044951, Apr. 12, 2017, WIPO, 11 Pages.

* cited by examiner

LOCALIZING DEVICES IN AUGMENTED REALITY ENVIRONMENT

BACKGROUND

Electronic devices may communicate with one another in various manners and for various purposes. For example, one device may identify and pair with one or more other devices by establishing a connection with each of the other devices. Once paired, the devices may perform any of a number of functions, such as one device controlling another and/or exchanging data between devices.

SUMMARY

Examples are disclosed herein that relate to identifying and localizing devices in an environment via an augmented reality display device. One example provides, on a portable augmented reality computing device, a method including establishing a coordinate frame for an environment, and discovering, via a location-sensitive input device, a location of a physical manifestation of the device in the environment. The method further includes assigning a device location for the device in the coordinate frame based upon the location of the physical manifestation, and modifying an output of the portable augmented reality computing device based upon a change in relative position between the portable augmented reality computing device and the physical manifestation in the environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Examples are disclosed herein that relate to automatic identification and localization of devices in an environment via physically detectable outputs corresponding to locations of the devices. Briefly, devices in the environment may output physical manifestations, e.g. lights, movements, sounds, etc. that are detectable by an augmented reality display device, for example by using on-board sensors. By communicating with such devices in the environment, the augmented reality display device may instruct each device to modulate a physical manifestation of the device, and then detect the modulation of the physical manifestation. In this manner, the augmented reality display device may determine a device location for each detected device within the environment. Localization of the devices in the environment may help an augmented reality experience to be tailored to the device locations. For example, an augmented reality display device may modify an image being displayed to avoid occluding the physical manifestation in the environment. Other adaptations of an augmented reality experience also may be made. For example, a user interface for a controllable external device in the environment may be displayed in proximity to the physical manifestation of the device, and/or sounds output by the augmented reality display device may be adapted to sound as if originating from an external device that has been localized.

Figure 1:
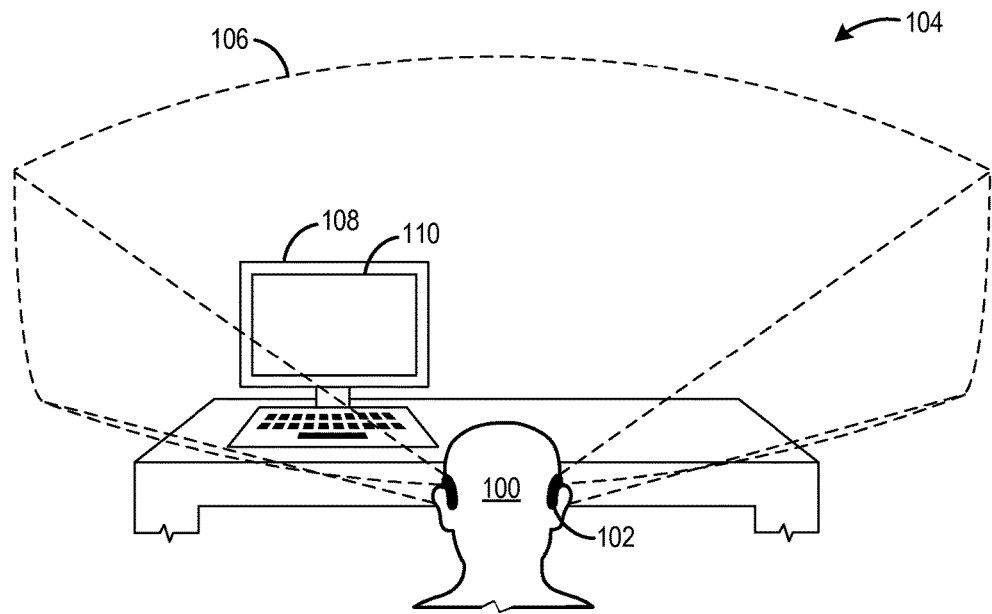
FIG. 1 shows an example use scenario for an augmented reality display device.

FIG. 1 shows an example use scenario in which a user 100 is wearing an augmented reality display device 102. The augmented reality display device is configured to mix virtual imagery displayed within an augmented reality field of view 106 with a see-through view of a real-world environment 104. As such, the augmented reality display device 102 includes a see-through display system that allows the presentation of augmented reality imagery via the display of virtual objects superimposed over the real-world environment 104.

To detect objects in the real-world environment 104, the augmented reality display device 102 may include one or more outward-facing image sensors configured to acquire image data of the real-world environment 104. Examples of such image sensors include, but are not limited to, depth sensor systems (e.g. time-of-flight and/or structured light camera(s), as well as stereo camera systems), visible light image sensors, and infrared image sensors. The augmented reality display device 102 further may be configured to establish a coordinate frame for the real-world environment 104 via the acquired image data. For example, the coordinate frame may be established from a three-dimensional mesh of the real-world environment 104 constructed from depth data acquired via an on-board depth sensor (e.g. by using a simultaneous localization and mapping method). In other examples, the augmented reality display device may obtain previously acquired and stored depth data of the real-world environment 104, stored either locally or remotely.

In the example of FIG. 1, the real-world environment 104 includes a device 108 in the form of a computing system having a display screen 110. In some instances it may be desired not to occlude the display screen 110 with augmented reality imagery. Thus, the augmented reality display device 102 may be configured to localize the display screen 110 by communicating with the device 108. Once localized, the augmented reality display device 102 may adjust displayed augmented reality imagery to avoid occlusion of the display screen 110. In some examples, the augmented reality display device 102 may utilize image data analysis to localize the display screen 110 and/or other objects of interest in a coordinate frame of the augmented reality display device 102.

In some examples, the augmented reality display device 102 may discover the presence, identity and/or location of the device 108 via acquired sensor data (e.g. image data, audio data, etc.) in order to communicate with the device 108. In other examples, the augmented reality display device 102 may detect the device 108 via a wireless network, such as via a WIFI or BLUETOOTH network (e.g. by a beaconing signal emitted by the device 108, or a response to a beaconing signal emitted by the augmented reality display device 102).

Once paired with the device 108 via the wireless network, the augmented reality display device 102 may communicate with the device 108 and instruct the device 108 to alter a physical manifestation in a way that is detectable by a location-sensitive input device of the augmented reality display device 102. Examples of physical manifestations of the device 108 that can be controlled to localize the device in an environment include, but are not limited to, a display output (e.g. turn the display on or off, display a specified color, display a specified image, etc.) and an audio output (e.g. display a specified tone detectable via a directional microphone array).

Based on the detected location of the physical manifestation, the augmented reality display device 102 assigns and stores a device location for the device 108 within the coordinate frame established by the augmented reality display device 102 for the real-world environment 104. As an example, with regard to the display screen 110, the device location may be stored as an area in the coordinate frame occupied by the display screen 110 (e.g. as defined by the four corners of or perimeter of the display screen 110), or the overall device 108 (e.g. as defined by a perimeter of the device 108). The device location further may comprise information regarding which side or sides of the manifestation are not to be occluded. The stored device location may then be taken into account when presenting augmented reality effects, such as avoiding visual occlusion of a real world object. As other examples, the augmented reality display device 102 may use the stored device location of the device 108 to display user interface elements that correspond to the stored device location, such as by positioning a virtual notification located above or nearby the device 108. Also, the augmented reality display device 102 may allow the user 100 to interact with displayed virtual icons representing files stored on the augmented reality display device 102, such as to drag-and-drop files (e.g. by moving virtual icons to a location over the real-world device) for transfer to the device 108 over the local area network.

Assigning the device 108 a location within the coordinate frame of the real-world environment 104 further allows the relative position of the device 108 and the augmented reality display device 102 to be tracked as a wearer of the augmented reality display device 102 moves about in the real-world environment 104. This allows the augmented reality display device 102 to modify its output based on a change in relative position between the augmented reality display device 102 and the physical manifestation of the device 108, for example, to move and/or modify a shape of a cutout region of a displayed virtual image to avoid occluding the physical manifestation and/or other objects.

Figure 2:
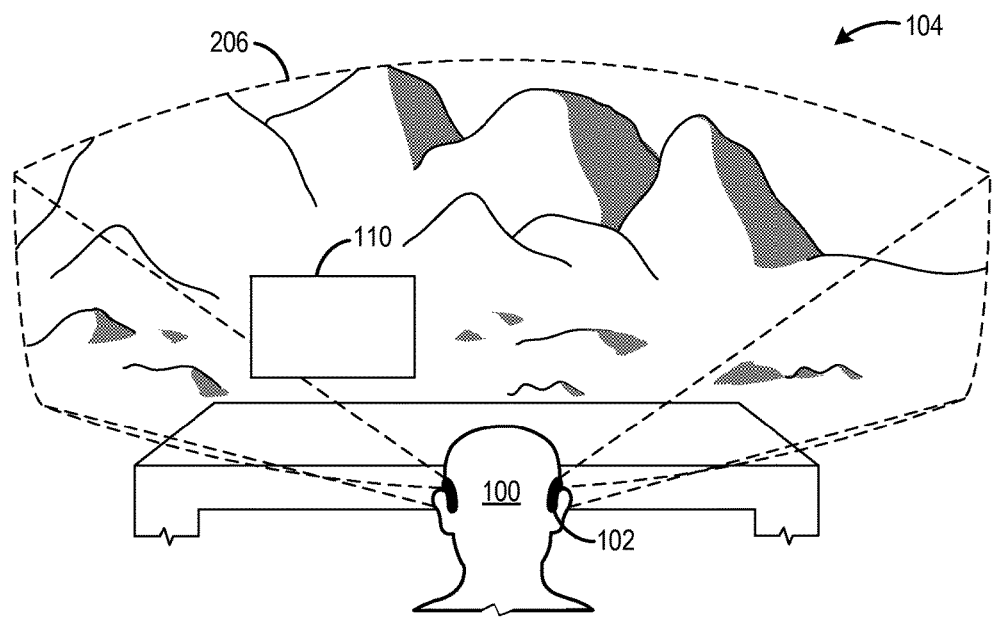
FIG. 2 shows an example augmented reality image displayed via an augmented reality display device that avoids visual occlusion of a physical manifestation of another device.

FIG. 2 shows the augmented reality display device 102 displaying virtual content (e.g. virtual terrain) superimposed over the real-world environment 104 within an augmented reality field of view 206, while avoiding occlusion of the display screen 110 such that any image being displayed on the display screen 110 may still be seen by the user 100. With the location and orientation of the boundary in the real-world environment 104 known, the augmented reality display device 102 may render an augmented reality image and remove a portion of the augmented reality image that corresponds to the size, shape and location of the display screen 110 from the perspective of the wearer of the augmented reality display device 102. As another example, the augmented reality display device 102 may capture the appearance of the display screen 110 and re-render the display screen 110 as part of the augmented reality image. In either instance, the user 100 may still view the display output of the device 108 in the environment 104 while also viewing virtual content displayed by the augmented reality display device 102. Various sensors on the augmented reality display device 102, such as image sensors and/or inertial motion sensors, may be used to track motion of the augmented reality display device 102 in the use environment, and as such may be used to update the augmented reality image based upon the tracking to continually avoid occluding the display screen 110.

It will be understood that the scenarios of FIG. 1 and FIG. 2 are presented for example and are not intended to be limiting in any manner, and the augmented reality display device 102 may identify and localize any other suitable devices in the environment. Examples include but are not limited to mobile devices, display devices, speakers, smart lights, printers, environmental systems (e.g. HVAC system components), and other controllable computing devices.

The augmented reality display device 102 further may include any other suitable location-sensitive input devices than image sensors, such as a directional microphone array or other location-sensitive acoustic input sensor. Additionally, an augmented reality display device may take any other suitable form than a head-mounted display device with a see-through display. For example, an augmented reality display device may be implemented as a virtual reality head-mounted display with an opaque screen and an outward-facing camera configured to display video from the outward-facing camera composited with virtual imagery. Also, an augmented reality display device may take the form of a non-wearable mobile display device configured to display virtual content via a viewfinder mode, or a wearable display device other than a head-mounted display device.

Figure 3:
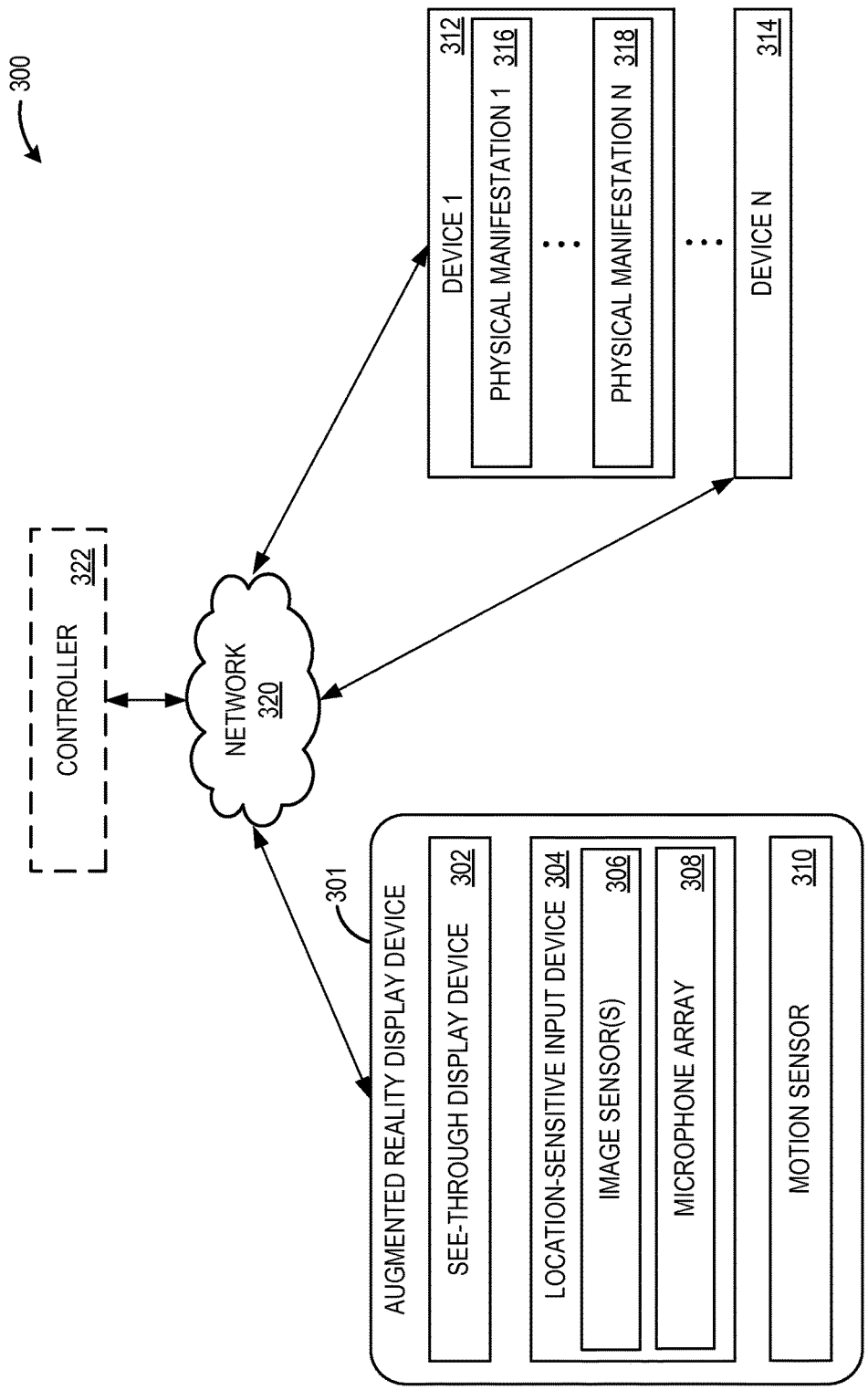
FIG. 3 shows a block diagram illustrating an example system comprising an augmented reality display device and other devices in an environment.

FIG. 3 shows a block diagram illustrating an example augmented reality display system environment 300 including an example augmented reality display device 301 and a plurality of devices in the environment connected via a network 320. The augmented reality display device 301 includes a see-through display device 302, and one or more location-sensitive input devices 304. Examples of location-sensitive input devices 304 include, but are not limited to, one or more image sensor(s) 306 and/or a microphone array 308. The augmented reality display device 301 further includes a motion sensor 310, such as an inertial measurement unit having one or more accelerometers and/or one or more gyroscopic sensors.

The augmented reality display device 301 may connect to one or more devices, illustrated as device 1 312 through device N 314. The illustrated devices 312, 314 may represent any suitable type of device. For example, one or more of devices 312, 314 may comprise a desktop computer, laptop computer, smart phone, tablet or other portable device, smart appliance, peripheral device, smart device hub (e.g. a controller configured to control plural smart devices, such as lights, environmental systems, alarms, etc. in the environment), and the like. Each of the devices may include one or more controllable physical manifestations, as illustrated at physical manifestation 1 316 through physical manifestation N 318 for device 1. Any suitable controllable and detectable physical manifestation may be used to localize a device. Examples include, but are not limited to, light outputs (e.g. display screens, status lamps/LEDs, light bulbs of controllable smart lamps, electrochromic devices), as well as speakers, motors, moving parts controlled by motors, and other devices that make detectable noises. The network 320 may represent any suitable communication network, including but not limited to a computer network (local area and/or wide area, wired, wireless, etc.), mobile phone network, and/or other suitable communications network. The augmented reality display device 301 may also connect to the devices via direct connections, e.g. via BLUETOOTH. In some examples, the augmented reality display device 301 may be configured to communicate with the devices via a controller 322, such as a smart device hub or other computing device, in the environment 300.

Figure 4:
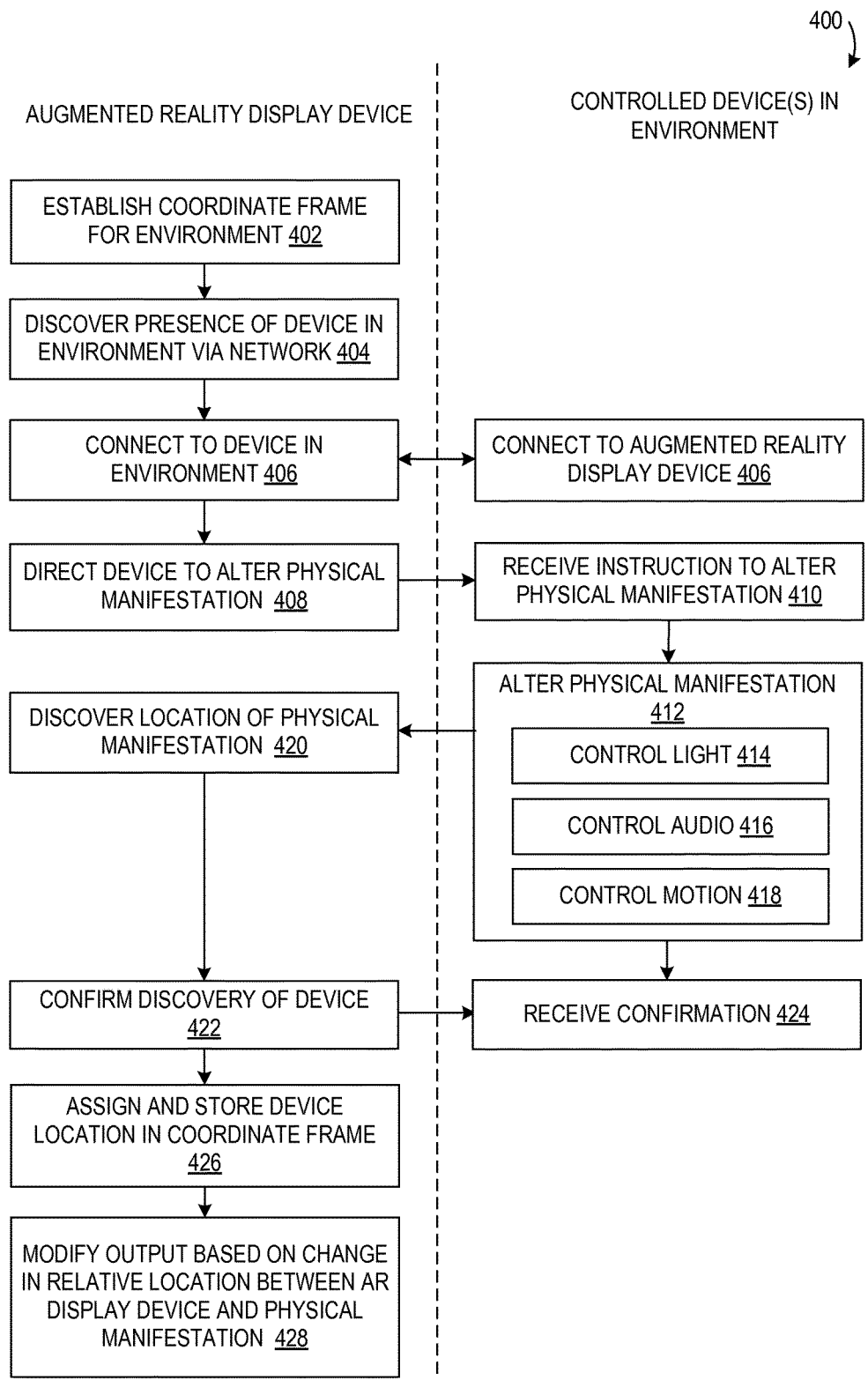
FIG. 4 shows a flowchart illustrating an example method of localizing devices in an environment.

FIG. 4 shows a flow diagram depicting an example method 400 for identifying and localizing devices in an environment via an augmented reality display device. At 402, the augmented reality display device may establish a coordinate frame for the environment, such as via depth data obtained from imaging the environment and/or from locally or remotely stored depth data. The augmented reality display device further may discover a presence of a device in the environment over a network, at 404. Some devices may provide a beaconing signal for discovery (e.g. a smart device or smart device hub), or may respond to a beaconing signal provided by the augmented reality display device. As such, at 406, the augmented reality display device and the device in the environment may connect to each other.

Continuing with method 400, after discovering the device, the augmented reality display device instructs the device in the environment to alter a physical manifestation, at 408. The physical manifestation may be integrated into the device itself (e.g. a display screen of a computing device), or may take the form of an output physically separate from but controlled by the device (e.g. a smart lamp controlled by a smart device hub controller). As such, in some examples, the augmented reality display device may directly communicate with the device in the environment to instruct the device to alter the physical manifestation. In other examples, the augmented reality display device may communicate with the device in the environment via another external device, such as a controller that controls the device.

At 412, the device in the environment alters the physical manifestation. The device may perform this process in any suitable way that is detectable by a location sensitive input device of the augmented reality display device. For example, the physical manifestation may take the form of light controlled by the device in the environment, at 414, that is detectable by an image sensor of the augmented reality display device. As described above with regard to FIG. 1 and FIG. 2, such a physical manifestation may take the form of content displayed on a display of a device in the environment. In some examples, the display may be separate from the device itself (e.g. a projector or monitor physically separate from the device providing outputs), while in other examples the display may be integrated with the device. In other examples, the physical manifestation may be the blinking of one or more lights emitted by a smart light, such as a lamp or overhead light in the environment.

As another non-limiting example, the physical manifestation may take the form of audio signals controlled by the device, at 416. For instance, the augmented reality display device may be configured to identify and control a speaker in the environment to emit one or more audio signals as a physical manifestation, and detect the audio signals via a microphone array. In another example, the device in the environment may be any other electronic device that may emit sounds, such as a printer, which when operating, emits printing sounds detectable by the augmented reality device. In such an example, the augmented reality device may instruct the printer to perform a function, e.g. print a piece of paper, and thus localize the printer within the environment based on recognition of the printing sounds, as well as the detection of printing actions via image data.

As yet another example, the physical manifestation may further take the form of a motion of an object being controlled by the device in the environment, at 418. For example, the device may be part of an electronic system, such as a remote control, switch, or similar for causing motion of an object, such as a controllable curtain system or fan. Thus, the augmented reality display device may direct the device in the environment to turn on or to control a motion of the object in a specific manner. It will be understood that any other suitable physical manifestations may be utilized, such as radio signals, barcodes, tags, etc.

At 420, the augmented reality display device may discover a location of the physical manifestation via a location-sensitive input device. Any suitable location-sensitive input device may be used. For example, an image sensor may detect light or motion as physical manifestations, while a microphone array may detect sound as physical manifestations. The augmented reality display device may further confirm discovery of the device in the environment with the controller, at 422, and the controller may receive the confirmation, at 424. The augmented reality display device may further assign and store a device location for the device in the coordinate frame based upon the location of the physical manifestation, at 426.

As mentioned above, the augmented reality display device may utilize the location of the physical manifestation as well as the device location to modify an output based on a change in relative location between the augmented reality display device and the physical manifestation of the device in the environment, at 428. For example, the augmented reality display device may be configured to output virtual audio effects as if originating from the location an identified and localized speaker. As another non-limiting example, the output may be an augmented reality image, and modifying the output may include modifying the augmented reality image to avoid occluding the physical manifestation. Further, the location of each physical manifestation with respect to the augmented reality display device may be continually tracked to update any such outputs. Other visual modifications may include visually augmenting the appearance of a device and/or its physical manifestation.

The location of the physical manifestation and/or the device in the environment also may be used as contextual information in interpreting user inputs. For example, in the case of a computer connected to multiple output devices, such as multiple smart lights, a user interaction (e.g. eye gaze location or gesture input location) indicating a location of the physical manifestation may be detected as an input for controlling a function of the computing device (e.g. where a "turn on light" speech command is detected). As also mentioned above, the location of the device and/or physical manifestation may also be used as a reference location to display virtual objects corresponding to the device location, such as a virtual notification (e.g. a message received on the computer, an alert that a printer is low on toner, etc.) or a virtual control panel for the device (e.g. a virtual light switch for a smart lamp). As yet another example, location information may be used to interpret potentially ambiguous voice inputs.

It will be understood that all or some steps of method 400 may be repeated for identifying any additional devices within the environment. In the case of detecting the presence multiple devices in the environment, each device may be instructed to alter a specified physical manifestation, or to alter physical manifestations in a specified order, such that the augmented reality display device can distinguish the devices from each other. In some examples, the augmented reality display device may individually identify and localize each of multiple devices in an environment by instructing each device sequentially to alter their physical manifestations in the specified order. In other examples, a controller that controls multiple devices may control an order in which the devices manifest themselves, and communicate the order to the augmented reality display device.

Figure 5:
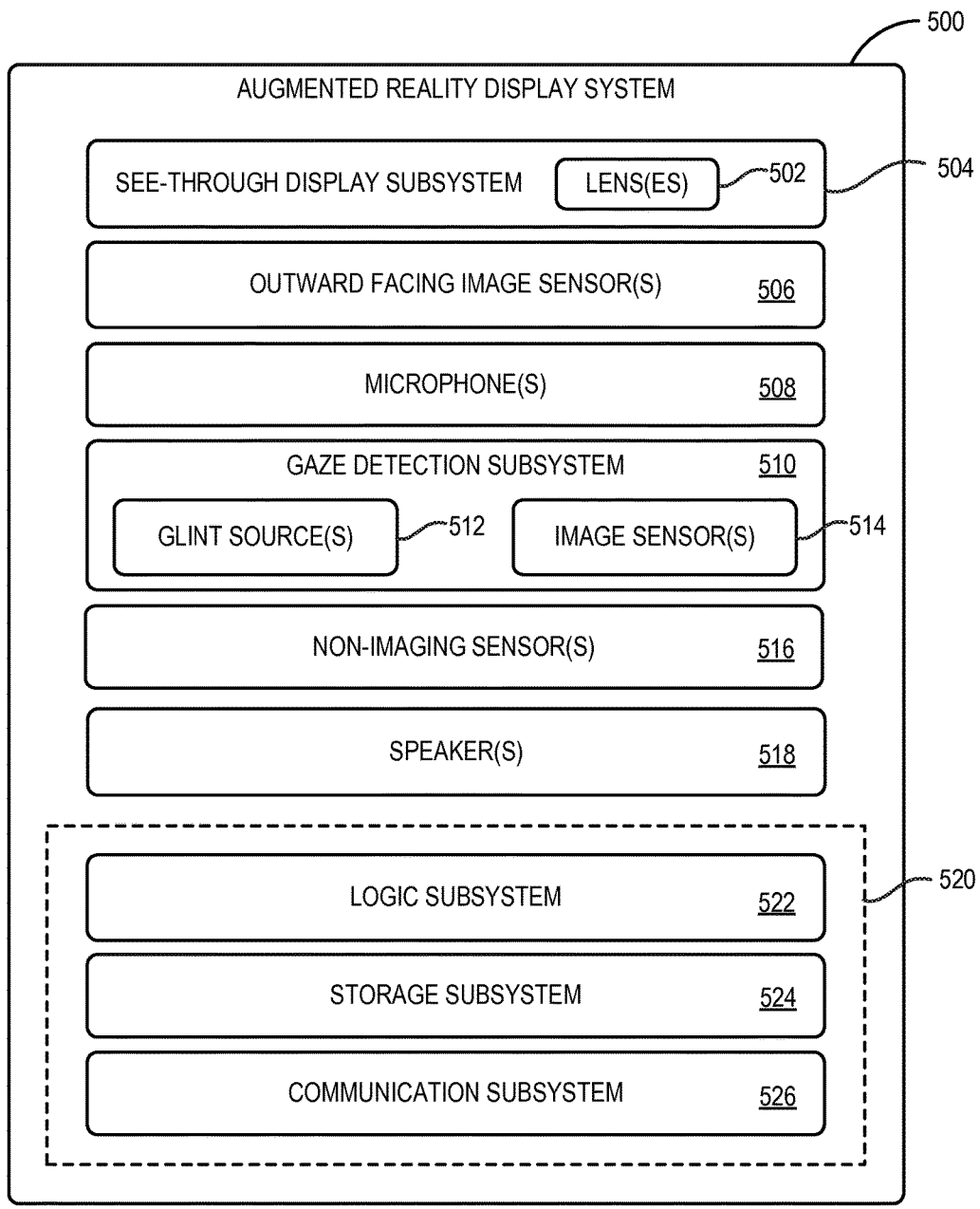
FIG. 5 shows a block diagram of an example augmented reality display system.

FIG. 5 shows a block diagram of an example augmented reality display system 500. The augmented reality display system 500 includes one or more lenses 502 that form a part of a see-through display subsystem 504, such that images may be displayed via lenses 502 (e.g. via projection onto lenses 502, waveguide system(s) incorporated into lenses 502, and/or in any other suitable manner) while a real-world background is viewable through the lenses 502. The augmented reality display system 500 further includes one or more outward-facing image sensors 506 configured to acquire images of a real-world environment being viewed by a user, and may include one or more microphones 508 configured to detect sounds, such as voice commands from a user, ambient sounds, or sounds output as physical manifestations of devices in the environment. The outward-facing image sensors 506 may include one or more depth sensor(s) and/or one or more two-dimensional image sensor(s) (e.g. RGB image sensors). In other examples, the augmented reality display system 500 may display video-based augmented reality images via a viewfinder mode using data from an outward-facing image sensor, rather than via a see-through display subsystem.

The display system 500 may further include a gaze detection subsystem 510 configured to detect a gaze of a user for detecting user input, for example, for interacting with devices, physical manifestations thereof, displayed virtual objects, and/or for performing other computing device actions. The gaze detection subsystem 510 may be configured to determine gaze directions of each of a user's eyes in any suitable manner. For example, in the depicted embodiment, the gaze detection subsystem 510 comprises one or more glint sources 512, such as infrared light sources configured to cause a glint of light to reflect from each eyeball of a user, and one or more image sensor(s) 514, such as inward-facing sensors, configured to capture an image of each eyeball of the user. Changes in the glints from the user's eyeballs and/or a location of a user's pupil as determined from image data gathered via the image sensor(s) 514 may be used to determine a direction of gaze. The gaze detection subsystem 510 may have any suitable number and arrangement of light sources and image sensors. In other examples, the gaze detection subsystem 510 may be omitted.

The display system 500 also may include additional sensors, as mentioned above. For example, the display system 500 may include non-imaging sensor(s) 516, examples of which may include but are not limited to an accelerometer, a gyroscopic sensor, a global positioning system (GPS) sensor, and an inertial measurement unit (IMU). Such sensor(s) may help to determine the position, location, and/or orientation of the display device within the environment, which may help provide accurate tracking of the display device with regard to the real-world environment and locations of devices and/or physical manifestations in the environment. Such tracking, as mentioned above, may be used to appropriately modify outputs in an augmented reality setting, e.g. emitting virtual lights, sounds, objects, notifications, user interface elements, etc.

Motion sensors, as well as the microphone(s) 508 and the gaze detection subsystem 510, also may be employed as user input devices, such that a user may interact with the display system 500 via gestures of the eye, neck and/or head, as well as via verbal commands. It will be understood that sensors illustrated in FIG. 5 are shown for the purpose of example and are not intended to be limiting in any manner, as any other suitable sensors and/or combination of sensors may be utilized.

Display system 500 further includes one or more speaker(s) 518, for example, to provide audio outputs to a user for user interactions. Display system 500 further includes a controller 520 having a logic subsystem 522 and a storage subsystem 524 in communication with the sensors, gaze detection subsystem 510, display subsystem 504, and/or other components. Storage subsystem 524 comprises instructions stored thereon that are executable by logic subsystem 522, for example, to perform various tasks related to the identification and localization of devices in the environment, as disclosed herein. Logic subsystem 522 includes one or more physical devices configured to execute instructions. The communication subsystem 526 may be configured to communicatively couple the display system 500 with one or more other computing devices. Logic subsystem 522, storage subsystem 524, and communication subsystem 526 are described in more detail below in regard to computing system 600.

The see-through display subsystem 504 may be used to present a visual representation of data held by storage subsystem 524. This visual representation may take the form of an augmented reality image and/or a graphical user interface (GUI) comprising graphical user interface elements. As the herein described methods and processes change the data held by the storage subsystem, and thus transform the state of the storage subsystem. The state of see-through display subsystem 504 may likewise be transformed to visually represent changes in the underlying data. The see-through display subsystem 504 may include one or more display devices utilizing virtually any type of technology. Such display devices may be combined with the logic subsystem 522 and/or the storage subsystem 524 in a shared enclosure, or such display devices may be peripheral display devices.

It will be appreciated that the depicted display system 500 is described for the purpose of example, and thus is not meant to be limiting. It is to be further understood that the display system may include additional and/or alternative sensors, cameras, microphones, input devices, output devices, etc. than those shown without departing from the scope of this disclosure. For example, the display system 500 may be implemented as a virtual realty display system rather than an augmented reality system. Additionally, the physical configuration of a display device and its various sensors and subcomponents may take a variety of different forms without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
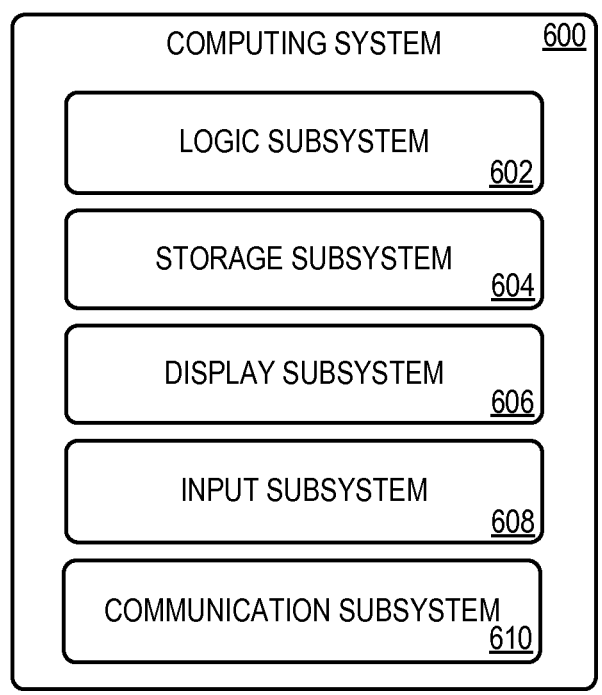
FIG. 6 shows a block diagram of an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices. For example, computing system 600 may represent augmented reality device 102, device 108, controller 322, or any suitable device identified by the augmented reality device in a real-world environment.

Computing system 600 includes a logic subsystem 602 and a storage subsystem 604. Computing system 600 may optionally include a display subsystem 606, input subsystem 608, communication subsystem 610, and/or other components not shown in FIG. 6.

Logic subsystem 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 602 may include one or more processors configured to execute software instructions. Additionally or alternatively, the logic subsystem 602 may include one or more hardware or firmware logic machines configured to execute hardware or firmware instructions. Processors of the logic subsystem 602 may be single-core or multi-core, and the instructions executed thereon may be configured for sequential, parallel, and/or distributed processing. Individual components of the logic subsystem 602 optionally may be distributed among two or more separate devices, which may be remotely located and/or configured for coordinated processing. Aspects of the logic subsystem 602 may be virtualized and executed by remotely accessible, networked computing devices configured in a cloud-computing configuration.

Storage subsystem 604 includes one or more physical devices configured to hold instructions executable by the logic machine to implement the methods and processes described herein. When such methods and processes are implemented, the state of storage subsystem 604 may be transformed—e.g., to hold different data.

Storage subsystem 604 may include removable and/or built-in devices. Storage subsystem 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 604 may include volatile, nonvolatile, dynamic, static, read/write, read-only, random-access, sequential-access, location-addressable, file-addressable, and/or content-addressable devices.

It will be appreciated that storage subsystem 604 includes one or more physical devices. However, aspects of the instructions described herein alternatively may be propagated by a communication medium (e.g., an electromagnetic signal, an optical signal, etc.), as opposed to being stored on a physical storage device.

Aspects of logic subsystem 602 and storage subsystem 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 600 implemented to perform a particular function. In some cases, a program may be instantiated via logic subsystem 602 executing instructions held by storage subsystem 604. It will be understood that different modules, programs, and/or engines may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service," as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage subsystem 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic subsystem 602 and/or storage subsystem 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 610 to send and/or receive messages to and/or from other devices via a network such as the Internet.

Another example provides, on a portable augmented reality computing device, a method comprising establishing a coordinate frame for an environment, discovering, via a location-sensitive input device, a location of a physical manifestation of a device in the environment, assigning a device location for the device in the coordinate frame based upon the location of the physical manifestation, storing the device location, and modifying an output of the portable augmented reality computing device based upon a change in relative position between the portable augmented reality computing device and the device in environment. The location-sensitive input device may additionally or alternatively include an image sensor. The method may additionally or alternatively include discovering the location of the physical manifestation by detecting a light controlled by the device in the environment. The method may additionally or alternatively include discovering the location of the physical manifestation by detecting motion of an object controlled by the device. The method may additionally or alternatively include discovering the location of the physical manifestation by detecting a location of a display screen. The location-sensitive input device may additionally or alternatively include a microphone array. The output may additionally or alternatively be an augmented reality image, and modifying the output of the portable augmented reality computing device may additionally or alternatively include modifying the augmented reality image to avoid occluding the physical manifestation with the augmented reality image. The method may additionally or alternatively include tracking motion of the portable augmented reality computing device and updating the augmented reality image based upon the tracking to avoid occluding the physical manifestation.

Another example provides an augmented reality display device, comprising a see-through display device, a location-sensitive input device, a logic device, and a storage device comprising instructions executable by the logic device to establish a coordinate frame for an environment based upon data from the location-sensitive input device, discover a presence of a device in the environment, conduct communication with the device to direct the device to alter a physical manifestation of the device in the environment, detect, via the location-sensitive input device, a location of the physical manifestation based on an alteration of the physical manifestation of the device in the environment, assign a device location for the device in the coordinate frame based upon the location of the physical manifestation, store the device location, and modify an output of the augmented reality display device based upon a change in relative position between the augmented reality display device and the physical manifestation in the environment. The location-sensitive input device may additionally or alternatively include an image sensor. The physical manifestation may additionally or alternatively include a light controlled by the device in the environment. The physical manifestation may additionally or alternatively include a motion of an object controlled by the device in the environment. The physical manifestation may additionally or alternatively include a display screen. The location-sensitive input device may additionally or alternatively include a microphone array. The output may additionally or alternatively be an augmented reality image, and the instructions may additionally or alternatively be executable to modify the augmented reality image to avoid occluding the physical manifestation with the augmented reality image. The augmented reality display device may additionally or alternatively include a motion sensor configured to track motion of the augmented reality display device. The augmented reality display device may additionally or alternatively be a head-mounted display device.

Another example provides a computing device, comprising a logic device, and a storage device comprising instructions executable by the logic device to establish a connection with a portable augmented reality display device, receive instruction from the portable augmented reality display device requesting the computing device to control each of a plurality of devices in the environment to alter a physical manifestation of the device in the environment, send to the portable augmented reality display device information regarding a device address of each device in the environment, send instruction to a first device of the plurality of devices in the environment to alter a physical manifestation output by the first device, receive confirmation from the portable augmented reality display device confirming discovery of the first device, send instruction to a second device of the plurality of devices in the environment to alter a physical manifestation output by the second device, and receive confirmation from the portable augmented reality display device confirming discovery of the second device. The instructions may additionally or alternatively be executable to control the plurality of devices in the environment to alter the physical manifestations in a specified order. The instructions may additionally or alternatively be executable to receive a request from the portable augmented reality display device for the device address of each device in the environment in a specified order.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a portable augmented reality computing device, a method comprising:
   establishing a coordinate frame for an environment;
   discovering, via a location-sensitive input device, a location of a physical manifestation of a device in the environment;
   assigning a device location for the device in the coordinate frame based upon the location of the physical manifestation;
   modifying an augmented reality image displayed by the portable augmented reality computing device based upon a change in relative position between the portable augmented reality computing device and the device in the environment by modifying a portion of the augmented reality image that corresponds to the device location to reduce occlusion of a view of the device in the environment by the augmented reality image.

2. The method of claim 1, wherein the location-sensitive input device comprises one or more of an image sensor and a microphone array.

3. The method of claim 1, wherein discovering the location of the physical manifestation comprises detecting a light controlled by the device in the environment.

4. The method of claim 1, wherein discovering the location of the physical manifestation comprises detecting motion of an object controlled by the device.

5. The method of claim 1, wherein discovering the location of the physical manifestation comprises detecting a location of a display screen.

6. The method of claim 1, further comprising discovering the device on a wireless network.

7. The method of claim 1, wherein the output is an augmented reality image, and wherein modifying the output of the portable augmented reality computing device comprises modifying the augmented reality image to avoid occluding the physical manifestation with the augmented reality image.

8. The method of claim 7, further comprising tracking motion of the portable augmented reality computing device and updating the augmented reality image based upon the tracking to avoid occluding the physical manifestation.

9. An augmented reality display device, comprising:
a see-through display device;
a location-sensitive input device;
a logic device; and
a storage device comprising instructions executable by the logic device to
 establish a coordinate frame for an environment based upon data from the location-sensitive input device,
 conduct communication with a device to direct the device to alter a physical manifestation of the device in the environment, the physical manifestation being detectable by the location-sensitive input device,
 detect, via the location-sensitive input device, a location of the physical manifestation based on an alteration of the physical manifestation of the device in the environment,
 assign a device location for the device in the coordinate frame based upon the location of the physical manifestation, and
 modify an output of the augmented reality display device based upon a change in relative position between the augmented reality display device and the physical manifestation in the environment by modifying a portion of an augmented reality image that corresponds to the device location to reduce occlusion of a view of the device in the environment by the augmented reality image.

10. The augmented reality display device of claim 9, wherein the location-sensitive input device comprises one or more of an image sensor and a microphone array.

11. The augmented reality display device of claim 9, wherein the physical manifestation comprises a light controlled by the device in the environment.

12. The augmented reality display device of claim 9, wherein the physical manifestation comprises a motion of an object controlled by the device in the environment.

13. The augmented reality display device of claim 9, wherein the physical manifestation comprises a display screen.

14. The augmented reality display device of claim 9, wherein the instructions are further executable to discover the device on a wireless network.

15. The augmented reality display device of claim 9, wherein the output is an augmented reality image, and wherein the instructions are executable to modify the augmented reality image to avoid occluding the physical manifestation with the augmented reality image.

16. The augmented reality display device of claim 9, further comprising a motion sensor configured to track motion of the augmented reality display device.

17. The augmented reality display device of claim 9, wherein the augmented reality display device comprises a head-mounted display device.

18. A computing device, comprising:
a logic device; and
a storage device comprising instructions executable by the logic device to
 establish a connection with a portable augmented reality display device remote from the computing device,
 receive instruction from the portable augmented reality display device requesting the computing device to control each of a plurality of devices in the environment to alter a physical manifestation of the device in the environment,
 send to the portable augmented reality display device information regarding a device address of each device in the environment,
 send instruction to a first device of the plurality of devices in the environment to alter a physical manifestation output by the first device that is detectable by a location-sensitive input device of the portable augmented reality display device,
 receive confirmation from the portable augmented reality display device confirming discovery of the first device,
 send instruction to a second device of the plurality of devices in the environment to alter a physical manifestation output by the second device that is detectable by the location-sensitive input device of the portable augmented reality display device, and
 receive confirmation from the portable augmented reality display device confirming discovery of the second device.

19. The computing device of claim 18, wherein the instructions are further executable to control the plurality of devices in the environment to alter the physical manifestations in a specified order.

20. The computing device of claim 18, wherein the instructions are executable to receive a request from the portable augmented reality display device for the device address of each device in the environment in a specified order.

* * * * *